United States Patent [19]

Kazmark

[11] 4,175,769

[45] Nov. 27, 1979

[54] PORTABLE LUGGAGE CARRIER

[76] Inventor: Eugene A. Kazmark, 5 Remin La., Joliet, Ill. 60433

[21] Appl. No.: 901,571

[22] Filed: May 1, 1978

[51] Int. Cl.² .............................................. B62B 11/00
[52] U.S. Cl. .................................................. 280/654
[58] Field of Search ............ 280/652, 654, 655, 47.23, 280/47.24, 47.27, 47.28, 47.29

[56] References Cited

U.S. PATENT DOCUMENTS

| | | | |
|---|---|---|---|
| 3,892,429 | 7/1975 | Dalmy | 280/654 |
| 4,040,642 | 8/1977 | David | 280/654 |
| 4,121,855 | 10/1978 | Mortenson | 280/654 |

Primary Examiner—Robert R. Song

[57] ABSTRACT

A portable luggage carrier is provided with a luggage-supporting base which is movable between a luggage-supporting position and a storage position. The luggage carrier includes a frame having a pair of spaced-apart frame members, a bracket mounted on each frame member, and an axle extending between the brackets. A pair of wheels are mounted on the axle. The base is provided by a generally U-shaped rod, the ends of which are looped around the axle so that the base is pivotally connected to the axle. A detent projection is mounted on each of the brackets for engagement with one of the end portions of the U-shaped rod for releasably locking the base in the luggage-supporting position.

7 Claims, 8 Drawing Figures

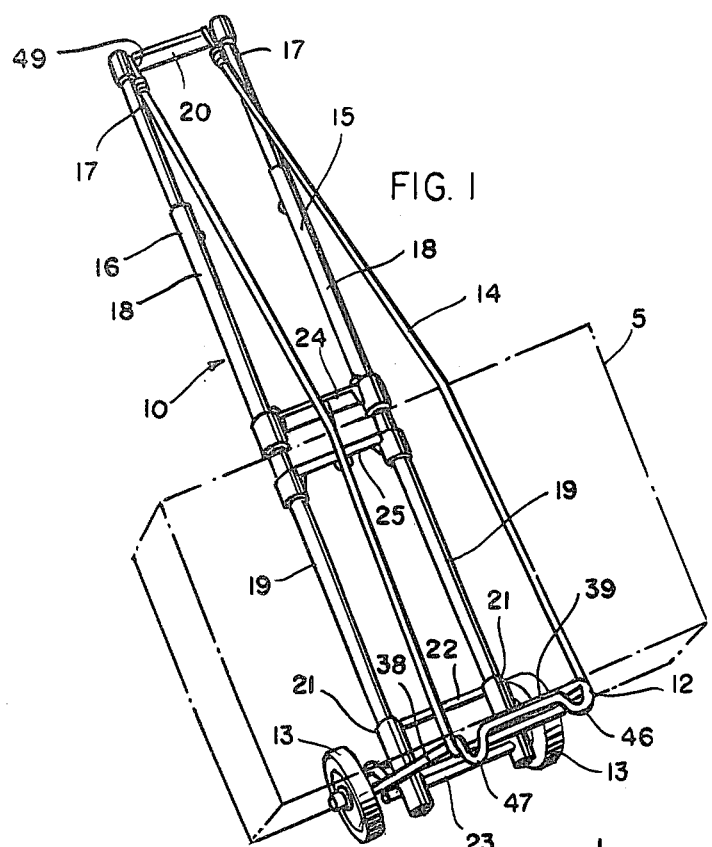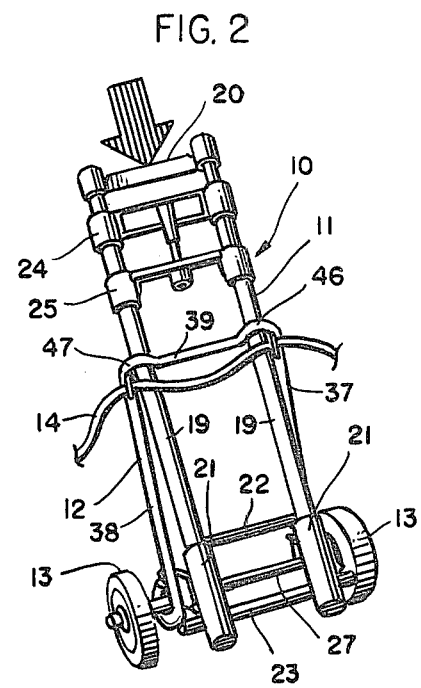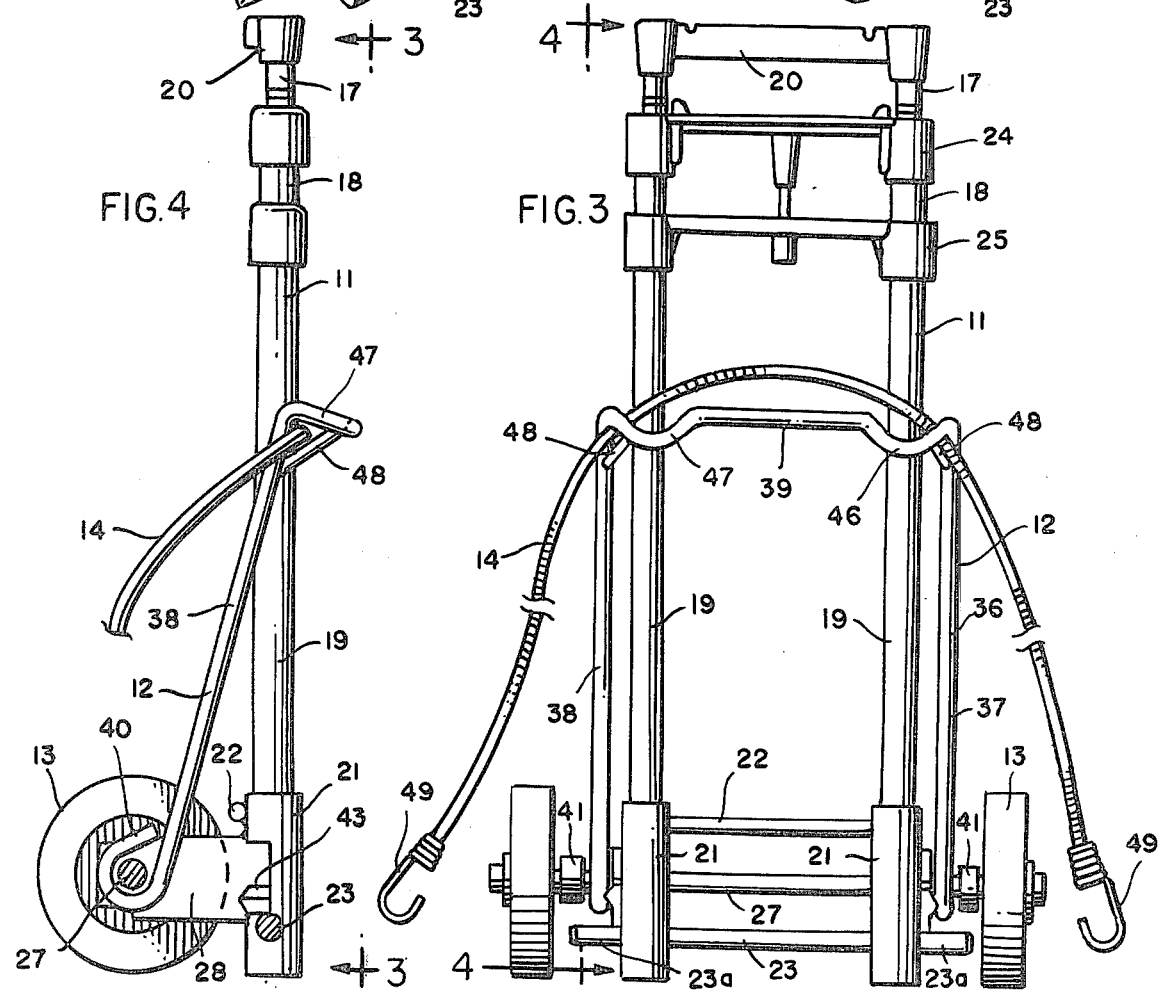

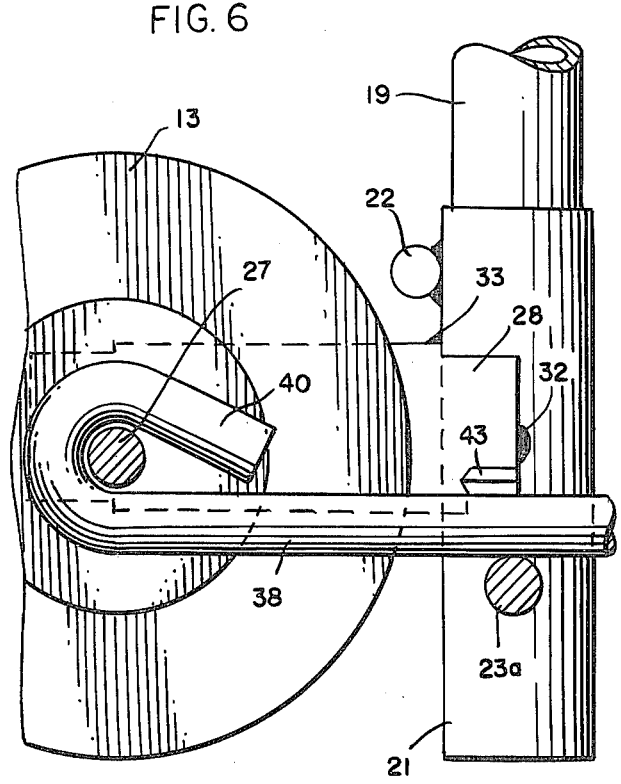
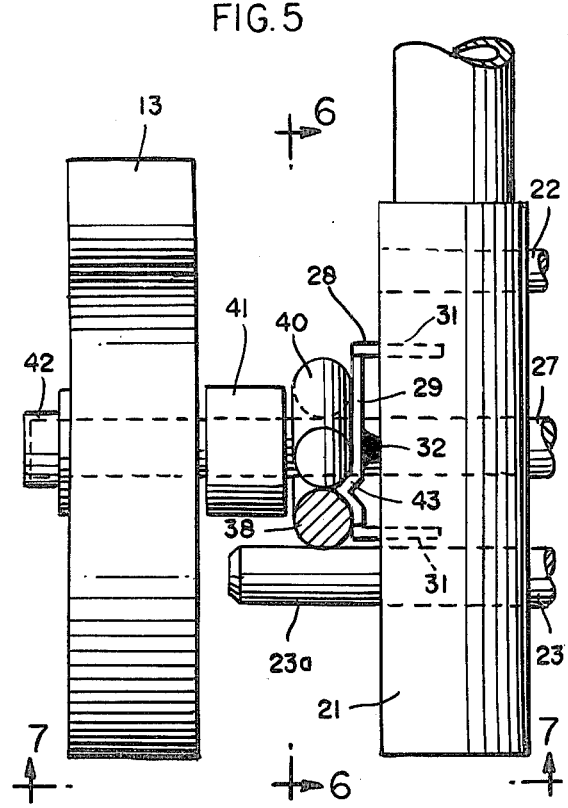
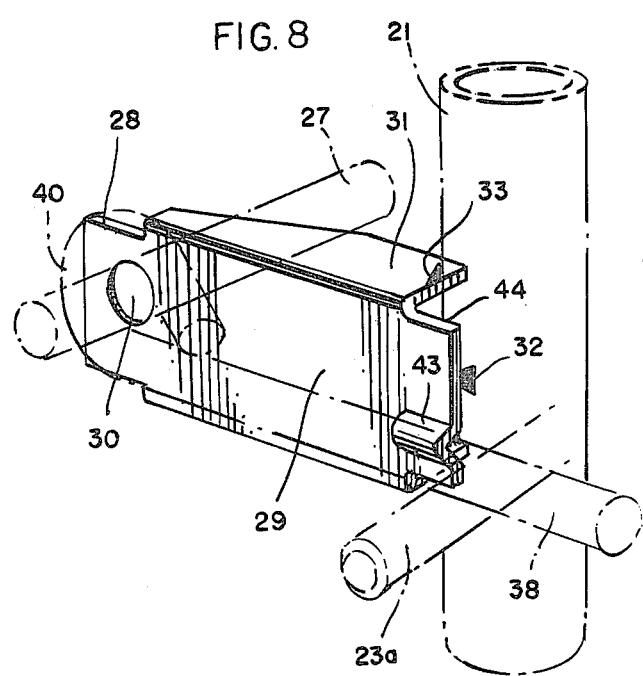
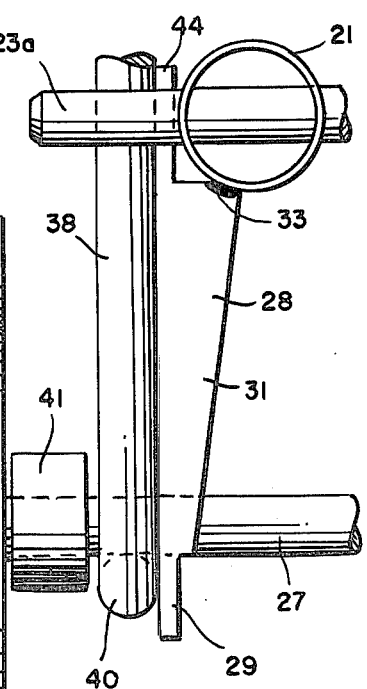

PORTABLE LUGGAGE CARRIER

BACKGROUND AND SUMMARY

This invention relates to portable luggage carriers, and, more particularly, to portable luggage carriers which can be collapsed into a compact storage configuration when not in use.

Luggage carriers for carrying luggage in airplane terminals, train stations, and the like are becoming increasingly popular. My prior U.S. Pat. Nos. 3,612,563 and 3,998,476 describe two such luggage carriers.

Some of the requirements of portable luggage carriers are that the carrier be strong enough to carry the desired weight and amount of luggage and that the carrier can be collapsed into a compact configuration so that the carrier can be carried onto the plane, train, etc. without difficulty. If more than one piece of luggage is to be carried, or if the piece has a substantially wide bottom, then the base should be wide enough to support the luggage. However, increasing the width of the base ordinarily increases the difficulties in providing a base which can be stored compactly and which has the necessary strength.

The invention provides a base which has a wide supporting area yet one which is inexpensive, strong, and can be pivoted into a compact storage configuration. Detents on the frame releasably lock the base in its luggage-supporting position.

DESCRIPTION OF THE DRAWING

The invention will be explained in conjunction with an illustrative embodiment shown in the accompanying drawing, in which FIG. 1 is a perspective view of a luggage carrier which includes a base in accordance with the invention;

FIG. 2 is a perspective view of the luggage carrier in the collapsed or storage configuration;

FIG. 3 is a front elevational view of the luggage carrier of FIG. 2;

FIG. 4 is a side elevational view, partially in sections, taken along the line 4—4 of FIG. 3;

FIG. 5 is an enlarged fragmentary view of the lower left portion of FIG. 3 but with the base in the luggage-supporting position;

FIG. 6 is a fragmentary sectional view taken along the line 6—6 of FIG. 5;

FIG. 7 is a bottom fragmentary view taken along the line 7—7 of FIG. 5; and

FIG. 8 is a perspective view of one of the detent brackets with the associated structure shown in phantom.

DESCRIPTION OF SPECIFIC EMBODIMENT

Referring first to FIG. 1, a luggage carrier 10 comprises a frame 11 and a luggage-supporting base 12 which is attached to the frame. The frame includes a pair of wheels 13 so that the carrier can be rolled along the floor, and an elastic strap 14 extends between the base and the top of the frame for holding a suitcase S shown in phantom against the frame.

The frame shown in the drawing is constructed in accordance with my U.S. Pat. No. 3,998,476, and the details of the frame are described therein. The frame includes two spaced-apart sets 15 and 16 of telescoping tubular frame members, each set comprising three tubes 17, 18, and 19. The upper ends of the tubes 17 are connected by a handle 20, and the lower ends of the tubes 19 are inserted into sleeves 21 which are connected by rod 22 and 23. The rod 22 is welded to the rear of each sleeve (see FIG. 6) and the rod 23 extends through the sleeves to provide a pair of stop portions 23a (FIG. 3). A pair of lock-release bars 24 and 25 extend between the two sets of tubular frame members, and the details of the release bars are described in U.S. Pat. No. 3,998,476.

The wheels 13 are mounted on an axle 27 which extends through a pair of detent brackets 28 (FIGS. 3-8). Each detent bracket is welded to one of the sleeves 21 and extends rearwardly therefrom. Each bracket includes a flat central portion 29 which has an axle opening 30 (FIG. 8) and upper and lower laterally extending reinforcing flanges 31. The bracket is welded to the sleeve by a weld 32 (FIGS. 5 and 8) at the middle of the central portion 29 and by welds 33 (FIGS. 6, 7, and 8) on the upper and lower flanges 31.

Referring now to FIGS. 3 and 4, the base 12 is formed integrally from a solid rod 36 which is bent into a generally U-shape to provide a pair of straight side rod portions 37 and 38 and a connecting rod portion 39 which extends between the two side rods. Each of the side rods terminates in a looped end portion 40 through which the axle 27 extends so that the base is pivotally mounted on the axle. A bushing or washer 41 rides on the axle between each of the side rods and the adjacent wheel to separate the wheel from the side rod and from the stop rod 23a (see FIGS. 3 and 5). After the axle is inserted through the looped ends 40 of the base and the detent brackets 28 and after the bushings and wheels are positioned on the axle, end caps 42 (FIG. 7) can be secured on the axle to retain the wheels thereon.

Each of the detent brackets includes a laterally outwardly extending generally V-shaped or U-shaped ridge or detent 43 (FIGS. 5 and 8) adjacent the front lower corner of the central portion 29. The length of the connecting rod 39 of the base is such that the side rods 37 and 38 extend alongside the outer surface of the central portion 29 of each detent bracket, and each detent 43 is engageable with one of the side rods when the side rods are pivoted about the axle toward the detent brackets. Referring to FIG. 8, the detent 43 is formed on a forward end portion 44 of the central portion 29 of the bracket which extends forwardly beyond the upper and lower flanges 33, and the weld 32 which joins the central portion 29 of the bracket to the sleeve 21 is spaced above the detent. Accordingly, the lower forward portion of the central portion 29 of the bracket on which the detent is formed can flex inwardly toward the sleeve to permit the side rod to pass if a sufficient force is exerted on the side rod to cam the V-shaped or U-shaped detent out of the way. For this purpose the bracket is preferably made from steel having sufficient strength to support the axle yet sufficient flexibility and resilience to permit the detent to flex out of the way of the side rod and return when the rod passes.

FIGS. 5 and 6 show the side rod 38 after it has been forced past the detent 43. The spacing of the rod 23 from the detent is such that the side rod will engage both the stop portion 23a and the detent and will thereby be maintained in a secure, rattle-free manner. The detent and the stop member are also positioned so that the side rods 37 and 38 will extend perpendicularly to the two sets 15 and 16 of tubular frame members when the side rods are in their locked positions illustrated in FIGS. 1, 5, and 6.

Referring to FIGS. 2-4, the connecting rod 39 of the base includes a pair of U-shaped foot portions 46 and 47 adjacent the side rods 37 and 38 which are generally aligned with the tubular frame members 19. Wen the base is in its luggage-supporting position shown in FIG. 1, the foot portions are engageable with the surface over which the carrier is being wheeled when the frame is positioned vertically and the side rods of the base are positioned horizontally. In this position the luggage carrier will be supported in a stable free-standing position by the wheels and the foot portions. When the base is in its raised or storage position shown in FIGS. 2-4, the foot portions will curve around the tubular frame members 19 and enable the base to be stored without the supporting feet projecting away from the frame any more than the thickness of the rod.

A pair of struts 48 (FIGS. 3 and 4) extend between the foot portions 46 and 47 and the adjacent side rods to reinforce the foot portions and to provide openings through which the elastic strap 14 can pass. Hooks 49 are attached to the ends of the strap so that the ends of the strap can be attached to the handle 20 as shown in FIG. 1.

The luggage carrier is shown in its luggage-supporting position in FIG. 1. The telescoping tubular frame members are extended, and the base 12 has been locked in its luggage-supporting position by camming the side rods 37 and 38 past the detents 43. The suitcase S is supported by the frame and the base and held by the strap 14.

When the luggage carrier is to be stored, the frame is telescoped as shown in FIG. 2, and the base is pivoted about the axle 27 to its storage position. The side rods 37 and 38 can be moved past the detents 43 merely by grasping the connecting rod 39 and exerting a sharp upward tug. The side rods will cam the detents laterally inwardly to permit the side rods to move upwardly past the detents.

Although the base is extremely simple in construction and can be mounted on the frame merely by inserting the axle through the looped ends 40, the metal rod 36 is extremely strong and is capable of supporting substantial weight.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. A portable luggage carrier comprising an elongated frame having upper and lower ends, a base for supporting luggage having a pair of spaced-apart rods pivotally mounted on the frame adjacent the lower ends thereof and movable between a storage position in which the rods extend generally parallel to the frame and a luggage-supporting position in which the rods extend perpendicularly to the frame, said frame including a pair of spaced-apart frame members and a detent bracket mounted on each of said frame members, an axle extending through said detent brackets, and a pair of wheels mounted on said axle, each of said detent brackets including a projection for releasably holding one of the rods in its luggage-supporting position, each projection having camming surfaces which are engageable with one of the rods whereby the projection can be cammed away from the rod to permit the rod to move to and from its luggage-supporting position.

2. The structure of claim 1 in which each of said rods is pivotally connected to said axle.

3. The structure of claim 1 including a stop member extending from each of said frame members adjacent the projection on the detent bracket which is mounted on the frame member, each stop member being spaced from the adjacent projection a distant corresponding to the thickness of said rods whereby each rod is maintained between one of said projections and one of said stop members when the rod is in its luggage-supporting position.

4. The structure of claim 3 in which the stop members are provided by a rod which extends between said frame members.

5. The structure of claim 1 in which said rods are connected by a transverse rod, said transverse rod having a pair of downwardly projecting foot portions which are engageable with a surface on which the wheels are supported when the rods are in their luggage-supporting position and extend generally horizontally.

6. The structure of claim 5 in which each of said foot portions is generally U-shaped and is aligned with one of said frame members.

7. The structure of claim 1 in which each of said rods includes an end portion which curves around said axle to pivotally connect the rod to the axle.

* * * * *